US012605945B2

(12) United States Patent
Ando

(10) Patent No.: US 12,605,945 B2
(45) Date of Patent: Apr. 21, 2026

(54) CUTTING DEVICE AND PRINTING DEVICE

(71) Applicant: TOSHIBA TEC KABUSHIKI KAISHA, Tokyo (JP)

(72) Inventor: Koichi Ando, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 18/644,033

(22) Filed: Apr. 23, 2024

(65) Prior Publication Data

US 2025/0050661 A1 Feb. 13, 2025

(30) Foreign Application Priority Data

Aug. 10, 2023 (JP) ................................ 2023-131272

(51) Int. Cl.
*B41J 11/66* (2006.01)

(52) U.S. Cl.
CPC .................................... *B41J 11/66* (2013.01)

(58) Field of Classification Search
CPC ........ B41J 11/66; B41J 3/4075; B41J 3/4078; B41J 11/703; B26D 7/1836
See application file for complete search history.

(56) References Cited

U.S. PATENT DOCUMENTS 4,541,340 A 9/1985 Peart et al.
5,199,341 A * 4/1993 Jones ..................... B26D 5/007 83/403.1
7,798,039 B2 * 9/2010 Schurch ................... B26D 7/08 83/13
8,701,533 B2 * 4/2014 Nihashi .................. B26D 7/065 83/349

(Continued)

FOREIGN PATENT DOCUMENTS

JP S5870898 U * 5/1983
JP S58207250 A * 12/1983

(Continued)

OTHER PUBLICATIONS

Extended European Search Report dated Oct. 31, 2024 issued in EP Application No. 24175098.3, 7 pages.

(Continued)

*Primary Examiner* — Christle I Marshall
(74) *Attorney, Agent, or Firm* — FOLEY & LARDNER LLP

(57) ABSTRACT

A cutting device includes: a cutter positioned on a conveyance path for conveying a fabric medium and configured to cut the fabric medium into a predetermined length; a placement surface defining a part of the conveyance path receiving the cut fabric medium; a rotation shaft positioned above the conveyance path and configured to rotate in a conveyance direction of the fabric medium; a paddle portion attached to the rotation shaft and configured to scrape the fabric medium placed on the placement surface in the conveyance direction by moving in the conveyance direction while in contact with the placement surface in accordance with a rotation operation of the rotation shaft; and a driver configured to transmit a driving force to the cutter and the rotation shaft, and such that a cutting operation of the cutter and the rotation operation of the rotation shaft are performed in conjunction with each other.

20 Claims, 14 Drawing Sheets

(56) References Cited

U.S. PATENT DOCUMENTS

2020/0264548 A1* 8/2020 Soga .................. G03G 15/6523
2020/0270091 A1* 8/2020 Yamada ............. G03G 15/6523

FOREIGN PATENT DOCUMENTS

JP 3042980 U 8/1997
JP 2002-274736 A 9/2002
JP 2013-255970 A 12/2013

OTHER PUBLICATIONS

Notice of Reasons for Refusal dated Jan. 20, 2026 issued in JP Application No. 2023-131272, with English translation, 7 pages.

* cited by examiner

CUTTING DEVICE AND PRINTING DEVICE

CROSS-REFERENCE TO RELATED APPLICATION

This application is based upon and claims the benefit of priority from Japanese Patent Application No. 2023-131272, filed on Aug. 10, 2023, the entire contents of which are incorporated herein by reference.

FIELD

Embodiments described herein relate generally to a cutting device and a printing device.

BACKGROUND

In related art, a printing device that performs printing on a long paper medium (hereinafter, also referred to as a paper label) is known. Such a printing device is provided with a cutting device having a cutter mechanism in order to cut a printed medium portion.

As a medium other than the paper label, a long fabric medium (hereinafter, also referred to as a fabric label) formed of a material such as polyester is known. In the above-described printing device, a quality indication of clothes or the like is printed on the fabric label, and the printed medium portion is cut and discharged from a discharge port, so that a care label to be added to clothes or the like can be generated.

The fabric label has a property different from that of the paper label. Specifically, the fabric label has a property of being weaker and easily charged as compared with the paper label medium. Therefore, for example, there is a possibility that the fabric label is charged due to friction or the like at the time of cutting after the printing is completed, and there is a problem that a JAM is likely to occur after cutting, such as the charged fabric label being stuck to a periphery of a cutter.

Although a stacker technique related to stacking and accommodating the care label has been proposed in the related art, no consideration is given to a step from cutting to conveyance (e.g., discharge, etc.) of the fabric label, and it is difficult to apply the stacker technique as it is.

DETAILED DESCRIPTION

In general, according to one embodiment, a cutting device and a printing device capable of efficiently conveying a cut fabric label are provided.

A cutting device according to an embodiment includes a cutting unit (e.g., cutter, etc.), a placement surface, a rotation shaft, a paddle portion, and a driving mechanism. The cutting unit is provided on a conveyance path for conveying a long fabric medium and is configured to cut the fabric medium into a predetermined length. The placement surface forms a part of the conveyance path and allows the fabric medium cut by the cutting unit to be placed. The rotation shaft is provided above the conveyance path and is configured to rotate in a conveyance direction of the fabric medium. The paddle portion is attached to the rotation shaft, and is configured to scrape the fabric medium placed on the placement surface in the conveyance direction by moving in the conveyance direction while being in contact with the placement surface in accordance with a rotation operation of the rotation shaft. The driving mechanism is configured to transmit a driving force to the cutting unit and the rotation shaft, and to make a cutting operation of the cutting unit and the rotation operation of the rotation shaft be in conjunction with each other.

Hereinafter, an embodiment will be described in detail with reference to the drawings. The present disclosure is not limited to the embodiment described below.

Figure 1:
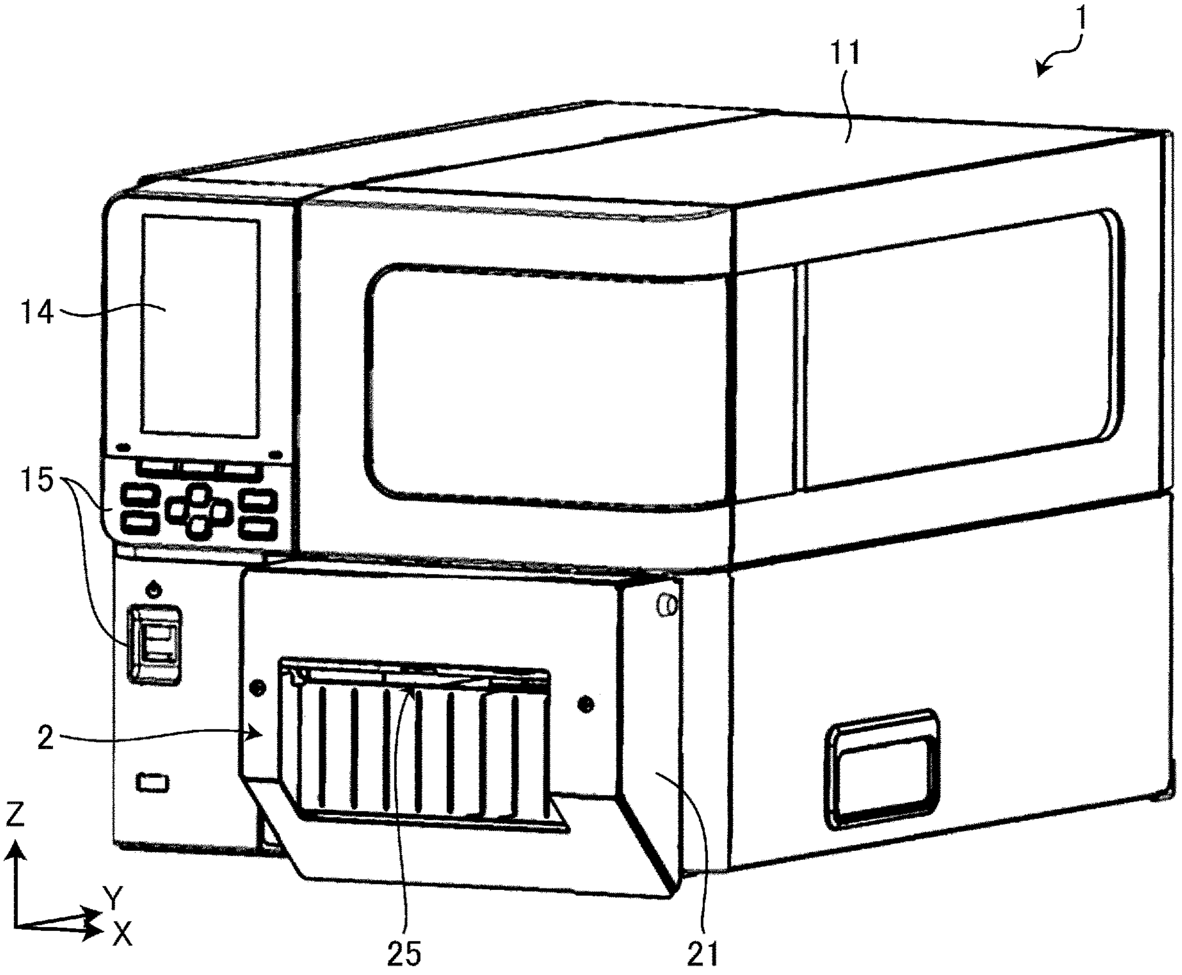
FIG. 1 is a perspective view illustrating a printer and a cutting device according to one embodiment.
Figure 2:
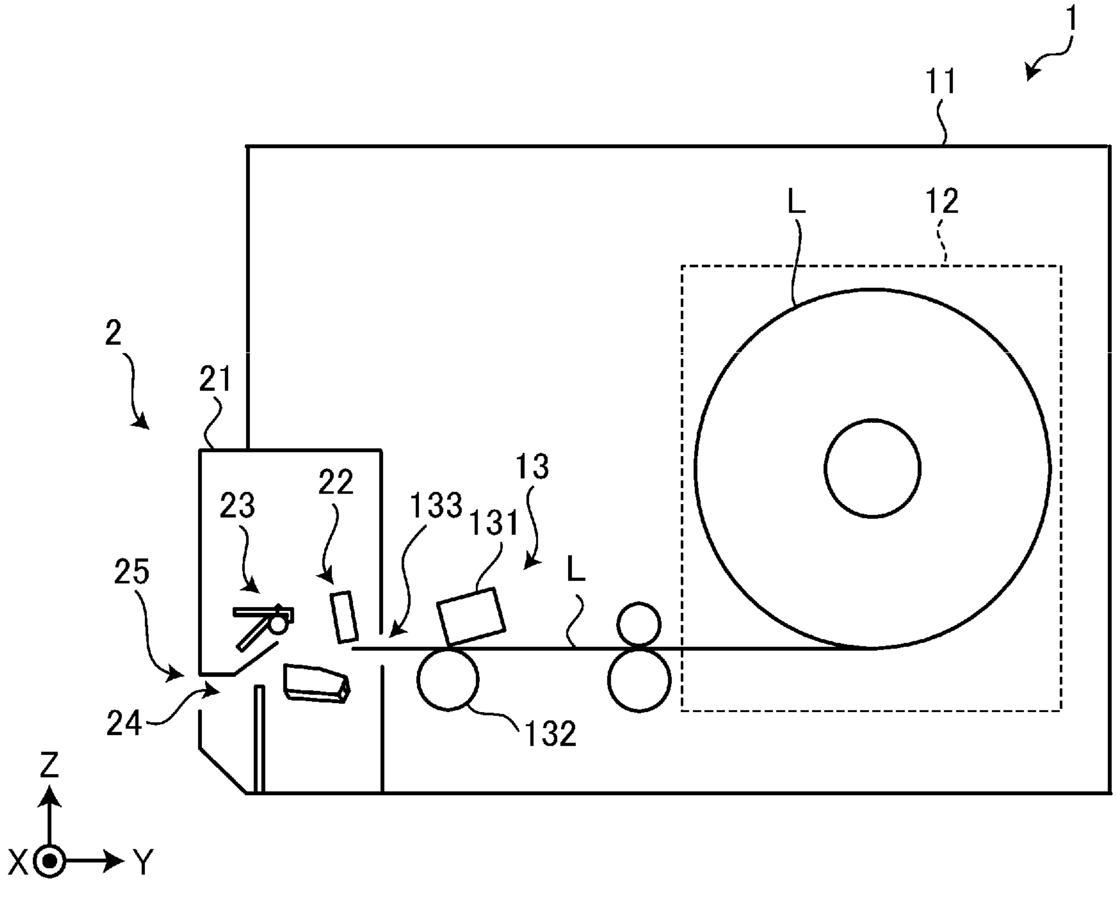
FIG. 2 is a diagram illustrating an internal configuration of a printer and a cutting device according to one embodiment.

FIG. 1 is a perspective view illustrating an example of an appearance of a printer and a cutting device according to the embodiment. FIG. 2 is a diagram illustrating an example of an internal configuration of the printer and the cutting device according to the embodiment.

Hereinafter, configurations of a printer 1 and a cutting device 2 will be described using three axial directions of an X-axis, a Y-axis, and a Z-axis orthogonal to one another. The X-axis is an axis that passes through the printer 1 in a left-right direction from a left side to a right side of the printer 1. The Y-axis is an axis that passes through the printer 1 in a front-back direction from a front side to a back side of the printer 1. The Z-axis is an axis that passes through the printer 1 in a vertical direction from a lower side to an upper side of the printer 1. Hereinafter, a Y-axis negative direction side is also referred to as the front side of the printer 1 (e.g., cutting device 2). A Y-axis positive direction side is also referred to as the back side of the printer 1 (e.g., cutting device 2).

The printer 1 is an example of a printing device disclosed herein. The printer 1 is used by being connected to an information processing device such as a PC in a wired or wireless manner. The printer 1 according to the present embodiment prints on a fabric label L to issue a care label.

The printer 1 includes a housing 11, a medium holding unit 12, a printing unit 13, a display unit 14, and an operation unit 15.

The housing 11 has a substantial box shape and incorporates the medium holding unit 12 and the printing unit 13. In addition, a control unit (not illustrated) such as a processor that collectively controls operations of the printer 1 and the cutting device 2 is incorporated in the housing 11.

The medium holding unit 12 holds the fabric label L wound in a roll shape so as to be freely fed out. The fabric label L is a long fabric medium formed of a material such as polyester.

The printing unit 13 includes a print head 131 and a platen 132. The fabric label L fed out from the medium holding unit 12 is inserted between the print head 131 and the platen 132 and conveyed toward a first discharge port 133.

The print head 131 is, for example, a thermal head, and performs printing on the fabric label L fed out from the medium holding unit 12. For example, the print head 131 may perform printing by using an ink ribbon (not illustrated) inserted between the print head 131 and the platen 132. The fabric label L printed by the print head 131 is conveyed to the cutting device 2 through the first discharge port 133. A printing method of the printing unit 13 is not particularly limited.

The display unit (e.g., a display, a screen, etc.) 14 includes a display device such as a liquid crystal display (LCD). The display unit 14 displays various types of information such as a screen illustrating a state of the printer 1 and a state of the cutting device 2 under the control of the control unit (not illustrated) included in the printer 1. The operation unit (e.g., the operator, etc.) 15 includes various buttons for operating the printer 1. For example, the operation unit 15 includes a power button, a paper feed button, and the like. The power button is an operation button for switching between operation and non-operation of the printer 1. The paper feed button is an operation button for instructing to drive a motor or the like to feed the fabric label L in a conveyance direction.

The cutting device 2 is an example of a cutting device. The cutting device 2 cuts the fabric label conveyed through the first discharge port 133 to a predetermined length. Specifically, the cutting device 2 cuts a portion (hereinafter, also referred to as a tip end portion) of the fabric label L on which printing is performed by the printing unit 13, and issues the cut portion as the care label.

The cutting device 2 is provided at a position facing the first discharge port 133 of the printer 1, and receives an input of the fabric label L printed by the printing unit 13 through the first discharge port 133. The cutting device 2 may be provided integrally with the printer 1 or may be detachable from the printer 1.

The cutting device 2 includes a cutting unit (e.g., a cutter, a knife, a blade, etc.) 22, a conveying unit (e.g., a conveyor, a provider, a transporter, etc.) 23, and a guide unit (e.g., a guide, etc.) 24 inside a housing 21. In addition, the cutting device 2 includes a driving mechanism (e.g., a driver, etc.) 3 (see FIGS. 4 to 6), which will be described later, inside the housing 21.

The cutting unit 22 has a cutting mechanism for cutting the fabric label printed by the printing unit 13. The conveying unit 23 conveys the fabric label L cut by the cutting unit 22 as the care label, and discharges the fabric label L from a second discharge port 25 provided in the housing 21. The guide unit 24 guides conveyance of the fabric label L cut by the cutting unit 22. Here, a path and direction from the first discharge port 133 toward the second discharge port 25 are a conveyance path and conveyance direction of the fabric label L in the cutting device 2.

Figure 3:
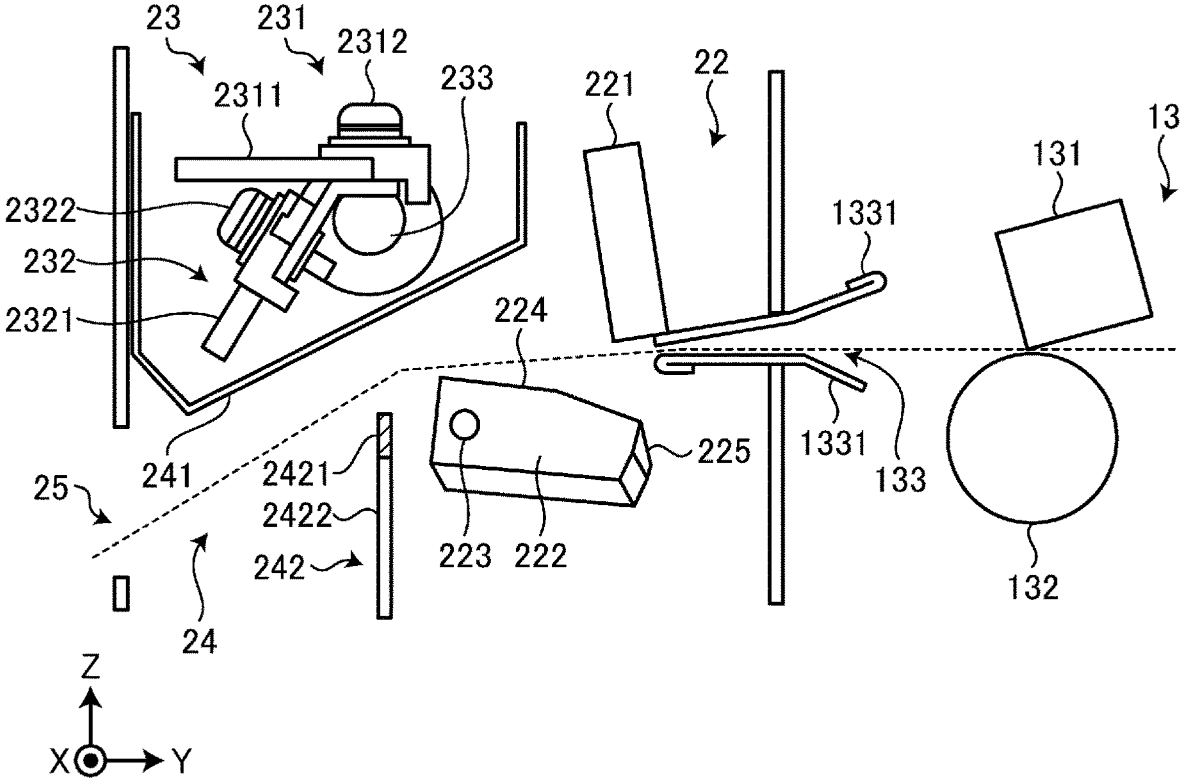
FIG. 3 is a vertical cross-sectional right side view illustrating a periphery of the cutting device in an enlarged manner according to the embodiment of FIG. 2.

Here, an internal configuration of a periphery of the cutting device 2 will be described with reference to FIG. 3. FIG. 3 is a vertical sectional right side view illustrating a periphery of the cutting device 2 in an enlarged manner. In FIG. 3, the conveyance path of the fabric label L is indicated by a broken line.

The cutting unit 22 includes a mechanism for cutting the fabric label L conveyed from the printing unit 13. Specifically, the cutting unit 22 includes a fixed blade 221 and a movable blade 222. FIG. 3 illustrates an example in which a guide member 1331 that guides the conveyance from the printing unit 13 to the cutting device 2 is provided at the first discharge port 133.

The fixed blade 221 is disposed at a rear stage of the first discharge port 133 and above the conveyance path, and has a blade directed to the conveyance path at a lower end. On the other hand, the movable blade 222 is provided below the conveyance path. The movable blade 222 is a substantially plate-shaped member extending in a width direction (e.g., a left-right direction, a horizontal direction, etc.) of the cutting device 2. The movable blade 222 has a support shaft 223 parallel to the width direction of the cutting device 2 at a position eccentric to downstream of the conveyance direction (e.g., a front side of the cutting device 2, etc.), and is rotatable about an axis of the support shaft 223.

An upper surface 224 of the movable blade 222 serves as a placement surface on which the cut fabric label L is placed. The placement surface forms a part of the conveyance path in a process of cutting the fabric label L. The upper surface 224 of the movable blade 222 may be a flat surface, or may have a mountain shape or the like in consideration of the conveyance of the fabric label L as illustrated in FIG. 2. The upper surface of the movable blade 222 is preferably a smooth sliding surface in order to implement smooth conveyance.

Further, a blade (hereinafter, also referred to as a blade surface 225) directed to the conveyance path is provided on an end surface (for example, an upper end portion) of the movable blade 222 upstream of the conveyance direction (back side of the cutting device 2). As the movable blade 222 rotates about the support shaft 223, the blade surface 225 moves from a lower side to an upper side and from the upper side to the lower side of the conveyance path, so that the fabric label L is sandwiched between the movable blade 222 and the fixed blade 221 and cut. That is, an arrangement position, size, shape, and the like of the movable blade 222 are designed, so that the blade surface 225 of the movable blade 222 passes through a position where the blade surface 225 meshes with the fixed blade 221 by the rotation about the support shaft 223.

The conveying unit 23 is provided downstream of the cutting unit 22 in the conveyance direction and above the conveyance path. The conveying unit 23 performs an operation for conveying the fabric label L cut by the cutting unit 22 to the second discharge port 25. Specifically, the conveying unit 23 includes a first paddle portion 231, a second paddle portion 232, and a paddle rotation shaft 233.

The paddle rotation shaft 233 is an example of a rotation shaft provided across the width direction of the cutting device 2. The paddle rotation shaft 233 rotates in a clockwise direction in the drawing corresponding to the conveyance direction of the fabric label L.

The first paddle portion 231 and the second paddle portion 232 are examples of paddle portions. The first paddle portion 231 and the second paddle portion 232 are attached to the paddle rotation shaft 233, so that the first paddle portion 231 and the second paddle portion 232 rotate in the clockwise direction in the drawing with the rotation of the paddle rotation shaft 233.

Here, the first paddle portion 231 and the second paddle portion 232 have different attachment angles with respect to the paddle rotation shaft 233. Specifically, as the paddle rotation shaft 233 rotates, the attachment angles with respect to the paddle rotation shaft 233 are different, such that the first paddle portion 231 first enters the conveyance path and then the second paddle portion 232 enters the conveyance path. The attachment angle difference between the first paddle portion 231 and the second paddle portion 232 is not particularly limited, and is preferably adjusted according to a type of the fabric label L or the like.

The first paddle portion 231 includes a first paddle blade 2311 and a first fixing portion 2312 for fixing the first paddle blade 2311 to the paddle rotation shaft 233. Similarly, the second paddle portion 232 includes a second paddle blade 2321 and a second fixing portion 2322 for fixing the second paddle blade 2321 to the paddle rotation shaft 233. The first fixing portion 2312 and the second fixing portion 2322 are formed of locking members such as screws.

The first paddle blade 2311 and the second paddle blade 2321 are formed of an elastic member such as ethylene propylene diene rubber (EPDM). The first paddle blade 2311 and the second paddle blade 2321 have a length that allows the first paddle blade 2311 and the second paddle blade 2321 to come into contact with the upper surface of the movable blade 222 as the paddle rotation shaft 233 rotates. Here, the length of the paddle blade means, for example, a length from a center of the paddle rotation shaft 233 to a tip end of the paddle blade, and is not limited to the length of the paddle blade itself. The lengths of the first paddle blade 2311 and the second paddle blade 2321 may be the same or different. In the present embodiment, the length of the second paddle blade 2321 is longer than that of the first paddle blade 2311.

Figure 4:
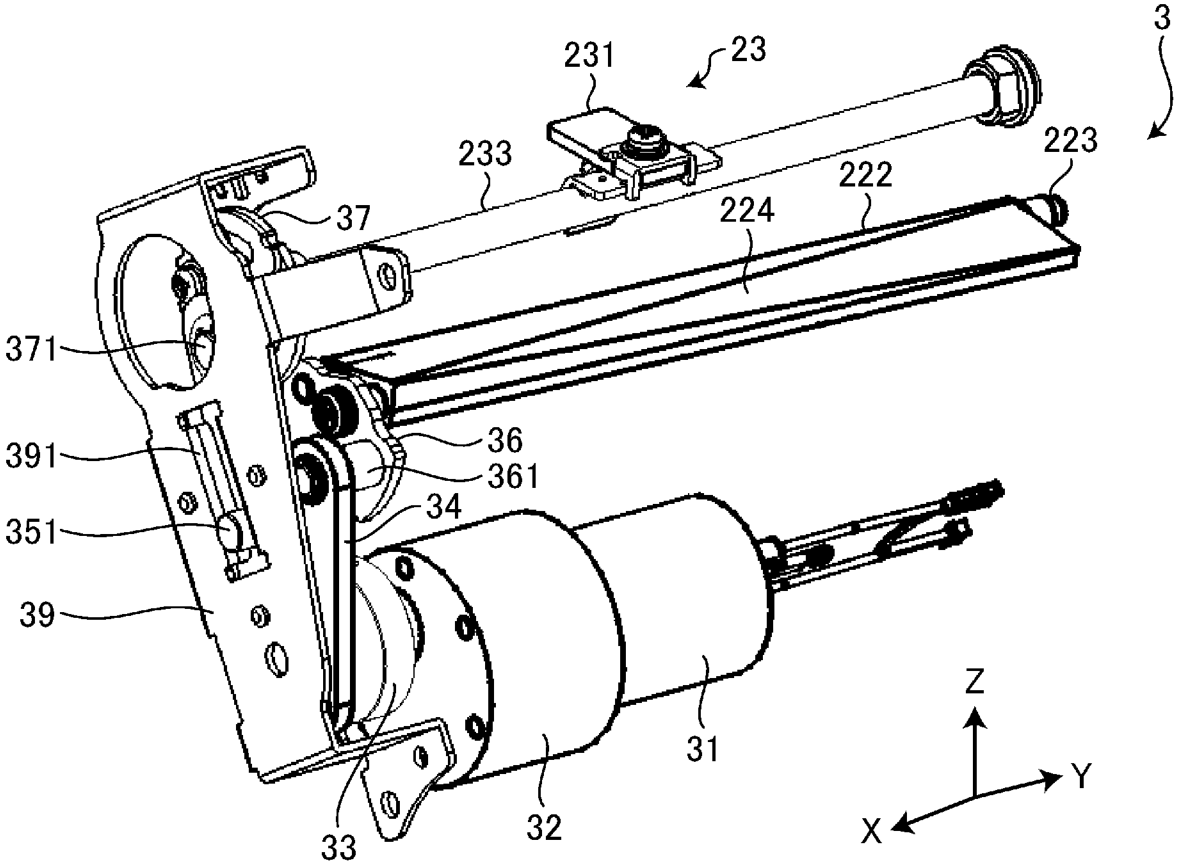
FIG. 4 is a perspective view illustrating a driving mechanism as viewed from a back side of a printer.
Figure 5:
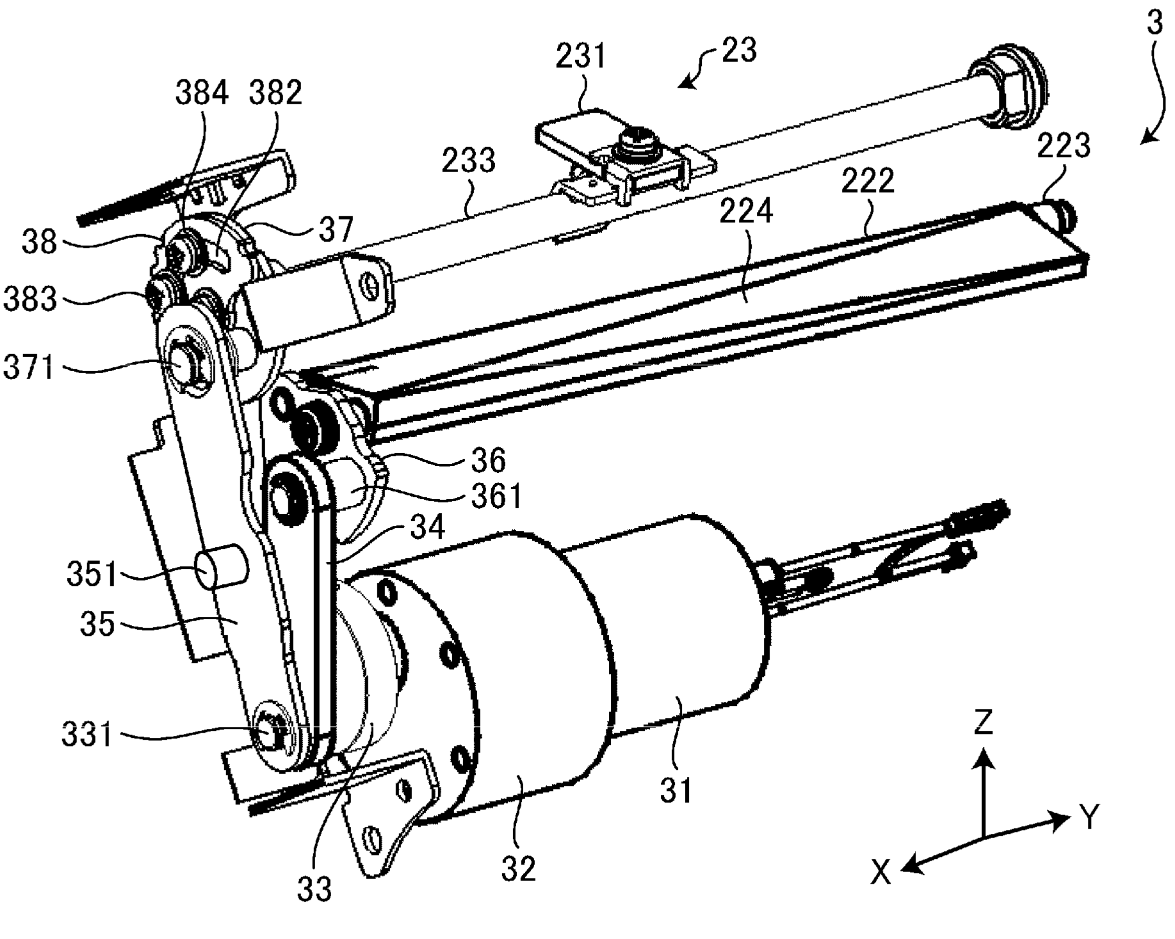
FIG. 5 is a perspective view illustrating a state in which a cover is removed from the driving mechanism of FIG. 4.
Figure 6:
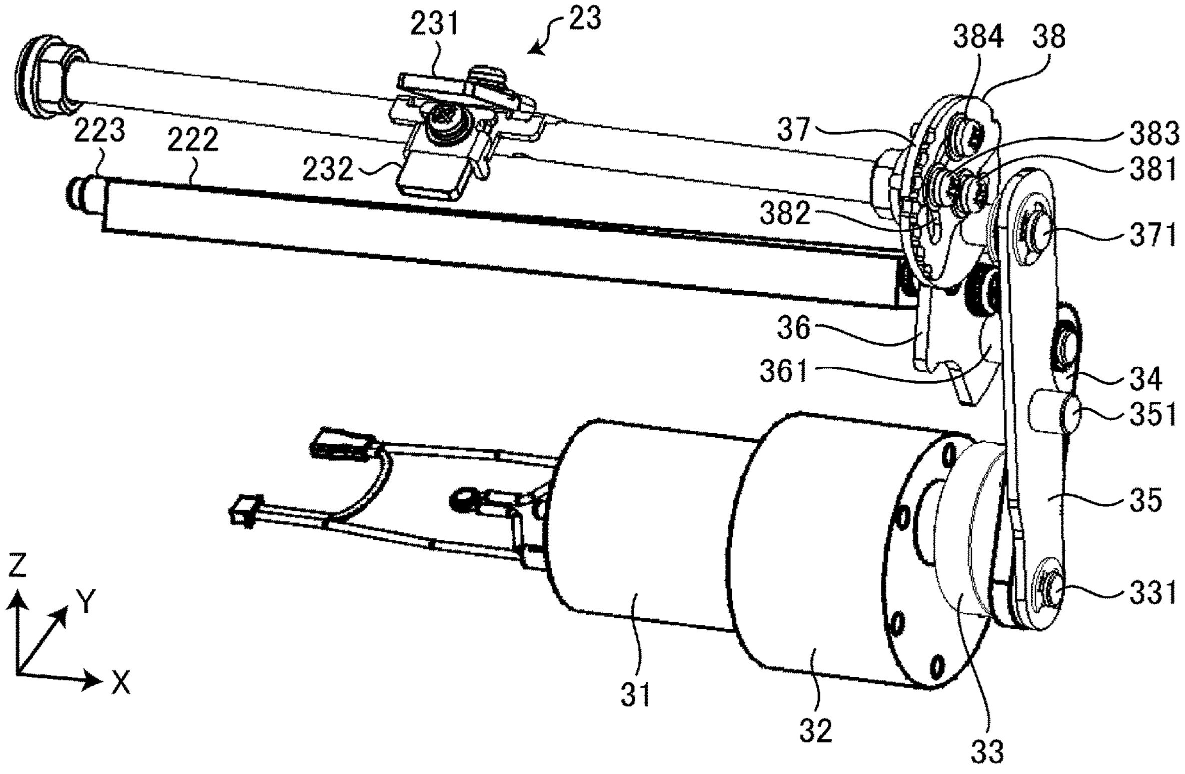
FIG. 6 is a perspective view illustrating the driving mechanism of FIG. 4 as viewed from a front side of the printer.

The paddle rotation shaft 233 rotates in conjunction with the rotation operation of the movable blade 222. Specifically, the driving mechanism 3 illustrated in FIGS. 4 to 6 is formed such that the rotation operation of the movable blade 222 in the vertical direction and the rotation operation of the paddle rotation shaft 233 are in conjunction with each other. Hereinafter, the driving mechanism 3 will be described with reference to FIGS. 4 to 6.

FIG. 4 is a perspective view illustrating the driving mechanism 3 as viewed from the back side of the printer 1. FIG. 5 is a perspective view illustrating a state in which a cover is removed from the driving mechanism in FIG. 4. FIG. 6 is a perspective view illustrating the driving mechanism 3 as viewed from the front side of the printer 1.

The driving mechanism 3 includes a driving motor 31 serving as a driving source and a first transmission mechanism 32 that transmits rotation of the driving motor 31 to a rotary body 33. The rotary body 33 has, for example, a disk shape, and rotates by receiving power from the first transmission mechanism 32. The rotary body 33 has a driving motor shaft 331 at a position eccentric from a rotation center. A first link 34 and a second link 35 are connected to the driving motor shaft 331 so as to be rotatable about an axis of the driving motor shaft 331. Hereinafter, the term "connect" used in the description of the driving mechanism 3 may be replaced with "join", "engage", or the like.

The first link 34 has one end connected to the driving motor shaft 331 and the other end connected to a first frame portion 36. The first frame portion 36 supports one end of the movable blade 222 in a longitudinal direction. The first frame portion 36 supports the movable blade 222 so as to be rotatable about the axis of the support shaft 223. The first frame portion 36 has a first driving shaft 361 at a position upstream of the conveyance direction away from the support shaft 223. The other end of the first link 34 is connected to the first driving shaft 361 so as to be rotatable around an axis of the first driving shaft 361.

In the above-described configuration, the first link 34 changes the rotational motion of the rotary body 33 into a reciprocating motion and transmits power of the motion to the first frame portion 36, thereby rotating (e.g., swinging, etc.) the first frame portion 36 in the vertical direction around the axis of the support shaft 223.

The second link 35 has one end connected to the driving motor shaft 331 and the other end connected to a second frame portion 37. The second frame portion 37 is a flange-shaped support body that supports one end of the paddle rotation shaft 233, and is integrally connected to the paddle rotation shaft 233 via a paddle angle adjustment plate 38.

The paddle angle adjustment plate 38 is formed of a semicircular plate-shaped member. The paddle angle adjustment plate 38 is fixed to one end of the paddle rotation shaft 233 by a shaft fixing screw 381 on a surface side of the second frame portion 37 facing the second link 35. Here, the paddle rotation shaft 233 is positioned at an arc center of the paddle angle adjustment plate 38.

Further, the paddle angle adjustment plate 38 has an arc-shaped long hole 382 around the paddle rotation shaft 233 so as to include screw holes 372 and 373 (see FIG. 7) opened in the second frame portion 37. In the paddle angle adjustment plate 38, adjustment plate fixing screws 383 and 384 are screwed into the screw holes 372 and 373 via the long hole 382, so that the paddle angle adjustment plate 38 and the second frame portion 37 are joined to each other. That is, the second frame portion 37 and the paddle rotation shaft 233 are integrally joined.

An arc length of the long hole 382 is larger than a length between the screw holes 372 and 373, that is, an arc length between the screw holes 372 and 373 with a center of the paddle angle adjustment plate 38 as a base point. This is because the adjustment plate fixing screws 383 and 384 can be inserted into the screw holes 372 and 373 via the long hole 382 even when the paddle angle adjustment plate 38 is moved (e.g., rotated, etc.) around the axis of the paddle rotation shaft 233.

In this manner, by attaching the paddle angle adjustment plate 38 to the second frame portion 37 via the long hole 382, it is possible to adjust a position around the axis of the paddle rotation shaft 233 when the paddle rotation shaft 233 is attached to the second frame portion 37. That is, it is possible to adjust a timing at which the first paddle portion 231 and the second paddle portion 232 reach the upper surface 224 (e.g., the placement surface, etc.) of the movable blade 222 when the paddle rotation shaft 233 is rotated.

The second frame portion 37 has a second driving shaft 371 at a position eccentric from a rotation center. The other end of the second link 35 is connected to the second driving shaft 371 so as to be rotatable around an axis of the second driving shaft 371. A convex sliding shaft 351 is provided on an outer surface of the second link 35.

The sliding shaft 351 of the second link 35 is fitted into a slit 391 provided in a cover 39 covering the first link 34 and the second link 35. The slit 391 is provided along a longitudinal direction of the second link 35, and guides a movement of the sliding shaft 351 in the longitudinal direction, that is, a movement of the second link 35.

In the above-described configuration, the second link 35 changes the rotational motion of the rotary body 33 into the reciprocating motion and slides along the slit 391 of the cover 39, thereby transmitting rotational power around the paddle rotation shaft 233 to the second frame portion 37. Accordingly, the first paddle portion 231 and the second paddle portion 232 rotate in the conveyance direction in accordance with the rotation of the paddle rotation shaft 233, thereby performing a scraping operation of biasing the fabric label L in the conveyance direction.

Figure 7:
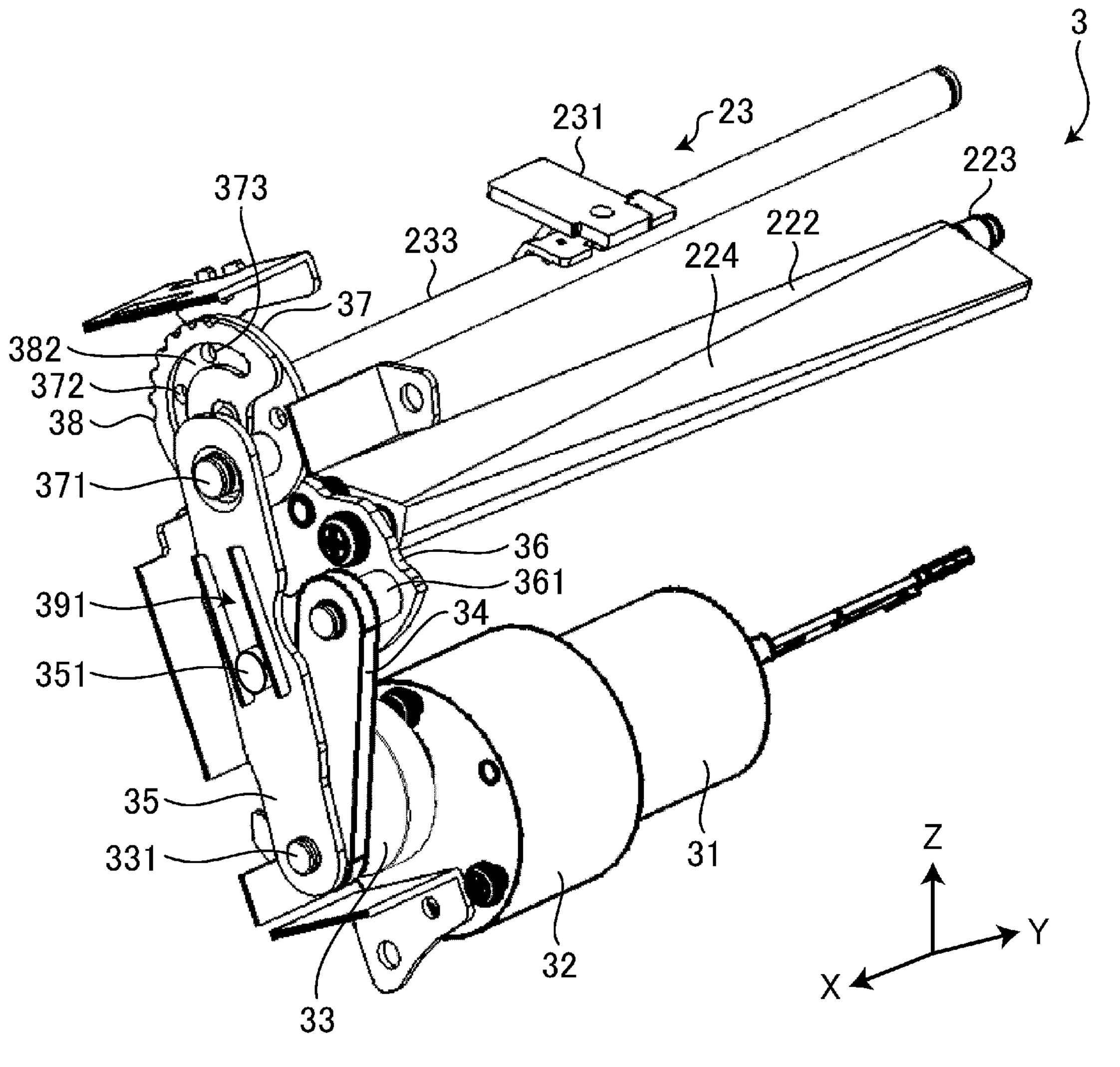
FIG. 7 is a diagram illustrating an operation of the driving mechanism of FIG. 4.
Figure 8:
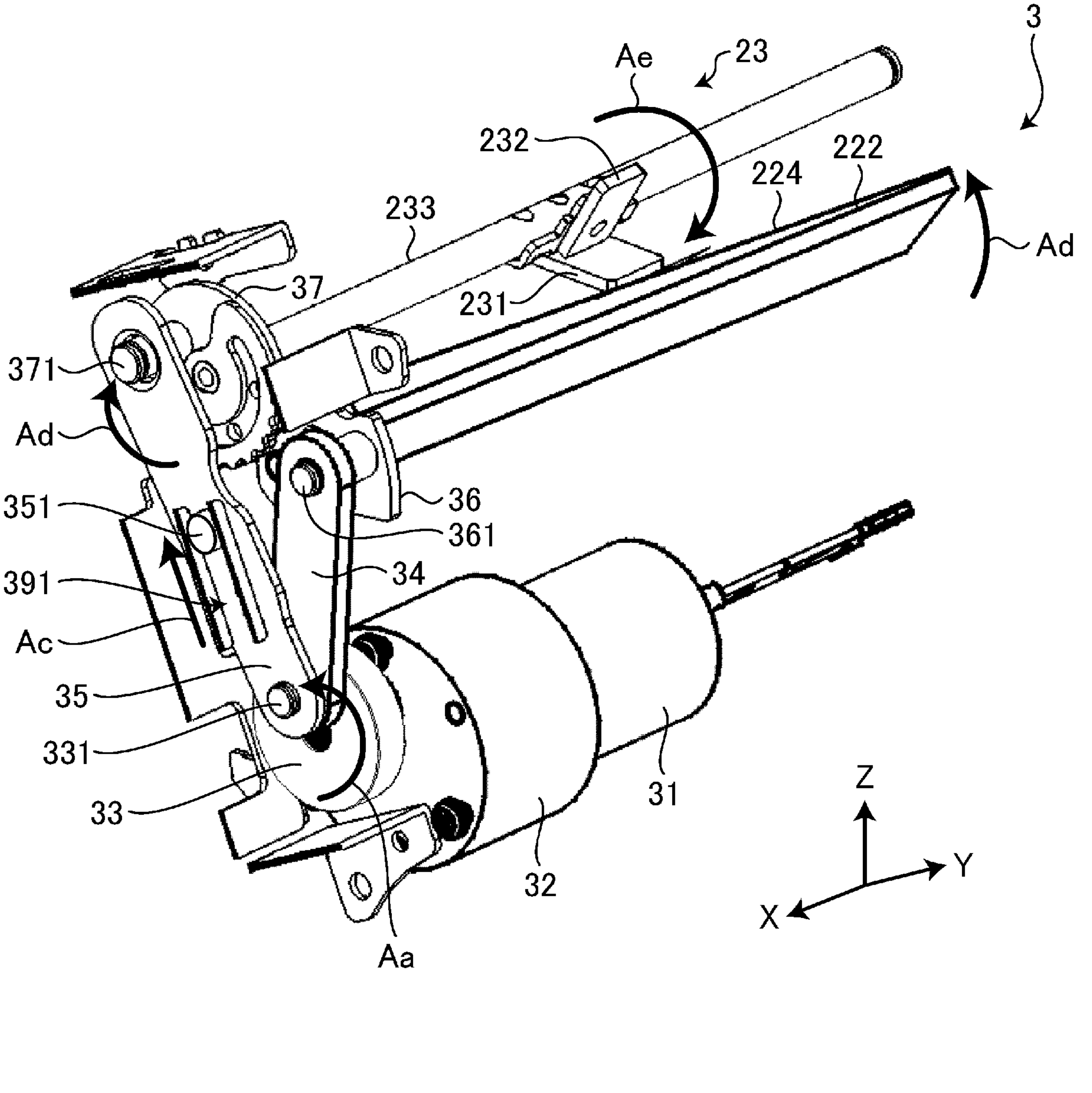
FIG. 8 is a diagram illustrating the operation of the driving mechanism of FIG. 4 according to another embodiment.
Figure 9:
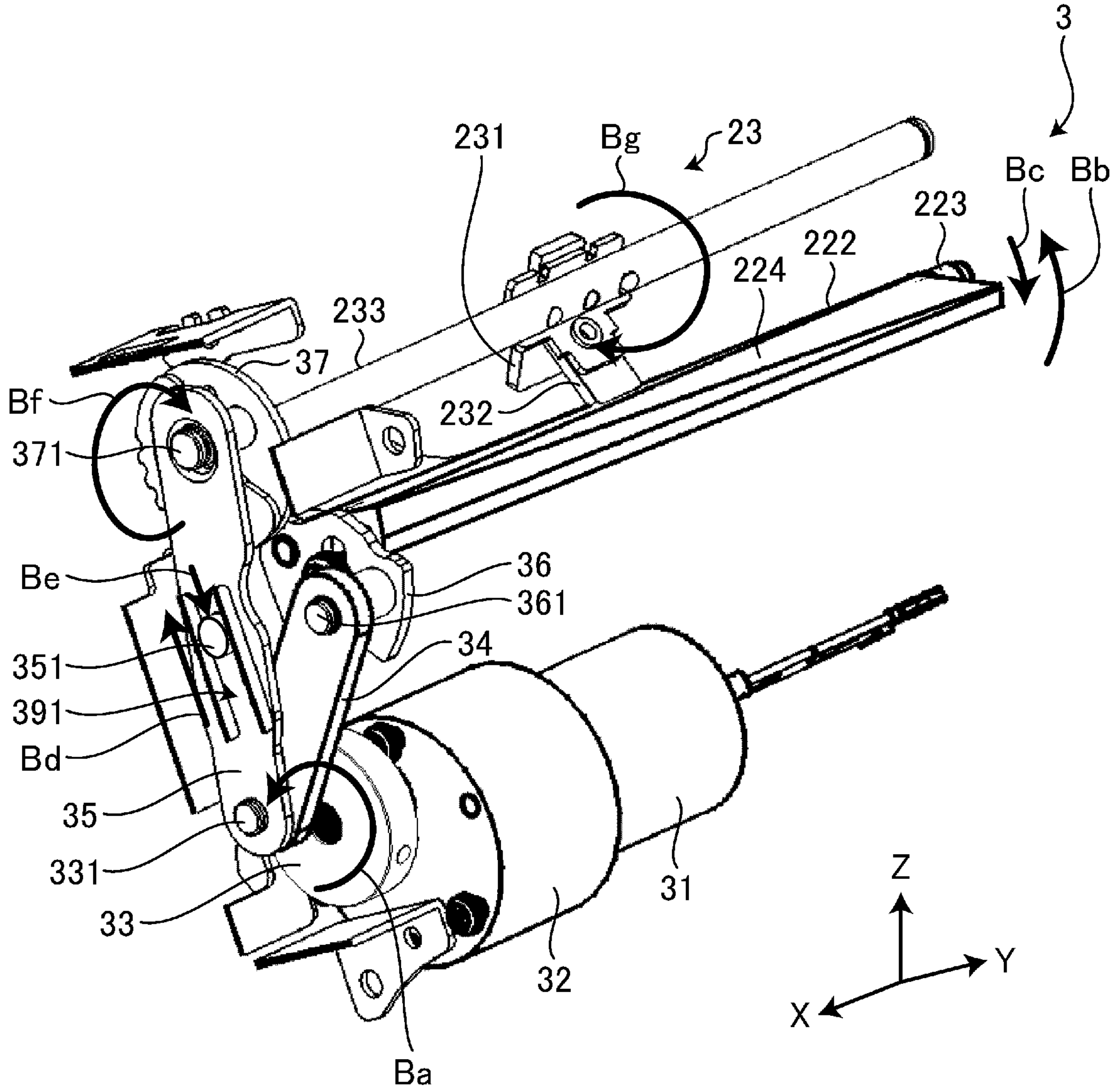
FIG. 9 is a diagram illustrating the operation of the driving mechanism of FIG. 4 according to another embodiment.

Next, cooperative driving of the movable blade 222 and the conveying unit 23 by the driving mechanism 3 will be described with reference to FIGS. 7 to 9. FIGS. 7 to 9 are diagrams illustrating operations of the driving mechanism 3, and illustrate a state in which the driving mechanism 3 is viewed from the back side of the printer 1. In FIGS. 7 to 9, the shaft fixing screw 381, the adjustment plate fixing screws 383 and 384, and the cover 39 are not illustrated. The slit 391 provided in the cover 39 is illustrated.

FIG. 7 is a view illustrating the driving mechanism 3 in a standby state. Here, the standby state means a state before the movable blade 222 moves upward. Specifically, the standby state means a state until the fabric label L is conveyed from the printing unit 13, as well as a state after the fabric label L is cut until cutting of the next fabric label L is started. Hereinafter, a position of each portion in the standby state illustrated in FIG. 7 is also referred to as a standby position.

The driving of the driving motor 31 is in synchronization with the conveyance of the fabric label L from the printing unit 13 under the control of the control unit (e.g., controller, etc.) (not illustrated) included in the printer 1.

In the driving mechanism 3 in the standby state, when the fabric label Lis conveyed from the printing unit 13 and stops after a predetermined conveyance amount, the driving motor 31 is driven and the rotary body 33 is rotated in an arrow Aa direction as illustrated in FIG. 8. As the rotary body 33 rotates, the power of the rotation is transmitted to the first link 34, so that the first frame portion 36 rotates about the axis of the support shaft 223 and the movable blade 222 moves in an arrow Ad direction. As the rotary body 33 rotates, the power of the rotation is transmitted to the second link 35, so that the second link 35 moves in an arrow Ac direction along the slit 391 and rotates the second frame portion 37 in the arrow Ad direction. Accordingly, the first paddle portion 231 and the second paddle portion 232 rotate in a direction about the axis of the paddle rotation shaft 233, that is, an arrow Ae direction. Each arrow indicates a movement direction and a movement amount with the standby position of each portion as a starting point.

Here, a rear end portion of the fabric label L present between the fixed blade 221 and the movable blade 222 is cut by the movement of the movable blade 222 in the arrow Ad direction. As the paddle rotation shaft 233 rotates in the arrow Ae direction, a tip end of the first paddle portion 231 (first paddle blade 2311) comes into contact with the upper surface 224 of the movable blade 222.

Subsequently, when the driving of the driving motor 31 continues and the rotary body 33 rotates to a position of an arrow Ba illustrated in FIG. 9, a movement of the movable blade 222 in an arrow Bb direction transitions to a movement of the movable blade 222 in an arrow Bc direction. The second link 35 rotates the second frame portion 37 to a position of an arrow Bf by transitioning a movement in an arrow Bd direction to a movement in an arrow Be direction along the slit 391. Accordingly, the first paddle portion 231 and the second paddle portion 232 rotate in an arrow Bg direction so as to continue the rotation about the axis of the paddle rotation shaft 233.

Here, due to the movement of the movable blade 222 from the arrow Bb direction to the arrow Bc direction, a part of the cut fabric label L, that is, a part of the care label is placed on the upper surface 224 of the movable blade 222. Due to the rotation of the paddle rotation shaft 233 in the arrow Bg direction, the tip end of the first paddle portion 231 moves on the upper surface 224 of the movable blade 222 in the conveyance direction, and then a tip end of the subsequent second paddle portion 232 comes into contact with the upper surface 224 of the movable blade 222.

After FIG. 9, the driving of the driving motor 31 continues, and each portion of the driving mechanism 3 moves to the standby position, so that the tip end of the second paddle portion 232 moves on the upper surface 224 of the movable blade 222 in the conveyance direction.

In this manner, the driving mechanism 3 drives the movable blade 222 to cut the tip end portion of the printed fabric label L. In addition, the driving mechanism 3 rotates and drives the paddle rotation shaft 233 in the conveyance direction in conjunction with the driving of the movable blade 222, so as to rotate the first paddle portion 231 and the second paddle portion 232 about the axis of the paddle rotation shaft 233.

Returning to FIG. 3, the description of the configuration of the cutting device 2 will be continued. The cutting device 2 includes the guide unit 24 for guiding the conveyance of the fabric label L cut by the cutting unit 22. Specifically, the guide unit 24 includes an upper guide unit 241 and a lower guide unit 242.

The upper guide unit 241 is provided above the conveyance path and downstream of the conveyance direction of the conveying unit 23. The upper guide unit 241 has an inclined surface continuing to the second discharge port 25, and guides the fabric label L conveyed by the conveying unit 23 to the second discharge port 25. The upper guide unit 241 is provided with a mudguard for interference avoidance so as not to interfere with the rotation operation of the conveying unit 23.

The lower guide unit 242 is provided below the conveyance path and below the conveying unit 23. Specifically, the lower guide unit 242 is provided substantially below the paddle rotation shaft 233 in the vertical direction.

The lower guide unit 242 includes a static removal brush 2421 and a support portion 2422. The static removal brush 2421 is an example of a static removal member. The static removal brush 2421 is provided to face upward, and removes static of the fabric label L conveyed on the conveyance path. The support portion 2422 is a support member that supports the static removal brush 2421 from below.

In the conveyance path, the lower guide unit 242 supports the fabric label L scraped from the upper surface 224 of the movable blade 222 by the conveying unit 23 from below, thereby guiding the conveyance of the fabric label L to the second discharge port 25. Here, a height of the lower guide unit 242, that is, a height of the static removal brush 2421 is designed to be a height that allows the lower guide unit 242 to come into contact with the first paddle portion 231 and the second paddle portion 232. The height of the static removal brush 2421 is designed based on a relationship with the upper surface 224 of the movable blade 222 as described later.

The printer 1 and the cutting device 2 are not limited to the configurations described above. For example, the printer 1 includes various sensors, a driving source for rotating the platen 132, and the like. The cutting device 2 includes an interface or the like for electrically connecting to the printer 1.

Next, an operation example of the cutting unit 22 and the conveying unit 23 described above will be described with reference to FIGS. 10 to 14. Here, FIGS. 10 to 14 are diagrams illustrating operations of the cutting unit 22 and the conveying unit 23. FIGS. 10 to 14 are vertical sectional right side views illustrating parts of the cutting unit 22 and the conveying unit 23.

First, when the printing is performed on the fabric label L by the printing unit 13, the fabric label L is conveyed into the cutting device 2 through the first discharge port 133. At this time, the tip end portion of the fabric label L passes between the fixed blade 221 and the movable blade 222 and is guided by the upper guide unit 241 to be fed toward the second discharge port 25. When the fabric label L is fed into the cutting device 2 by a predetermined conveyance amount, the conveyance of the fabric label L is stopped.

Figure 10:
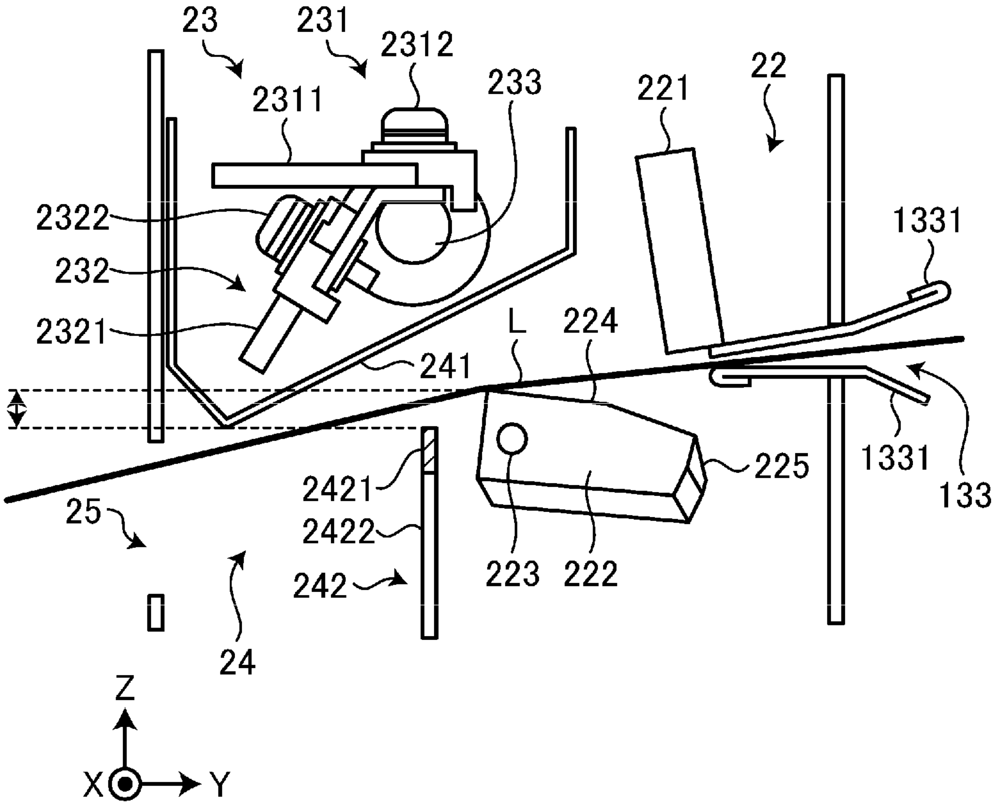
FIG. 10 is a diagram illustrating operations of a cutting unit and a conveying unit according to one embodiment.

FIG. 10 illustrates a state in which the fabric label L is conveyed from the printing unit 13 to the cutting device 2 and is stopped at the predetermined conveyance amount. At this time, the movable blade 222, the first paddle portion 231, and the second paddle portion 232 are located at the standby positions described above.

A height of a tip end of the lower guide unit 242 (e.g., the static removal brush 2421, etc.) is designed to be lower than a height of the upper surface 224 of the movable blade 222 on the lower guide unit 242 side, that is, the height on the downstream side in the conveyance direction when the movable blade 222 is in the standby position (standby state). Accordingly, the lower guide unit 242 allows the fabric label L that passes between the fixed blade 221 and the movable blade 222 to pass above the lower guide unit 242 and move toward the second discharge port 25 without interfering with the lower guide unit 242. Accordingly, in the cutting device 2, the fabric label L before being cut can be smoothly fed toward the second discharge port 25.

When the fabric label L is conveyed into the cutting device 2, the movable blade 222 is rotated upward (arrow direction in FIG. 11) by the driving mechanism 3 described above, and the fabric label L is sandwiched between the movable blade 222 and the fixed blade 221, so that the fabric label L is cut. At this time, a part of the cut fabric label L is placed on the upper surface 224 of the movable blade 222.

Figure 11:
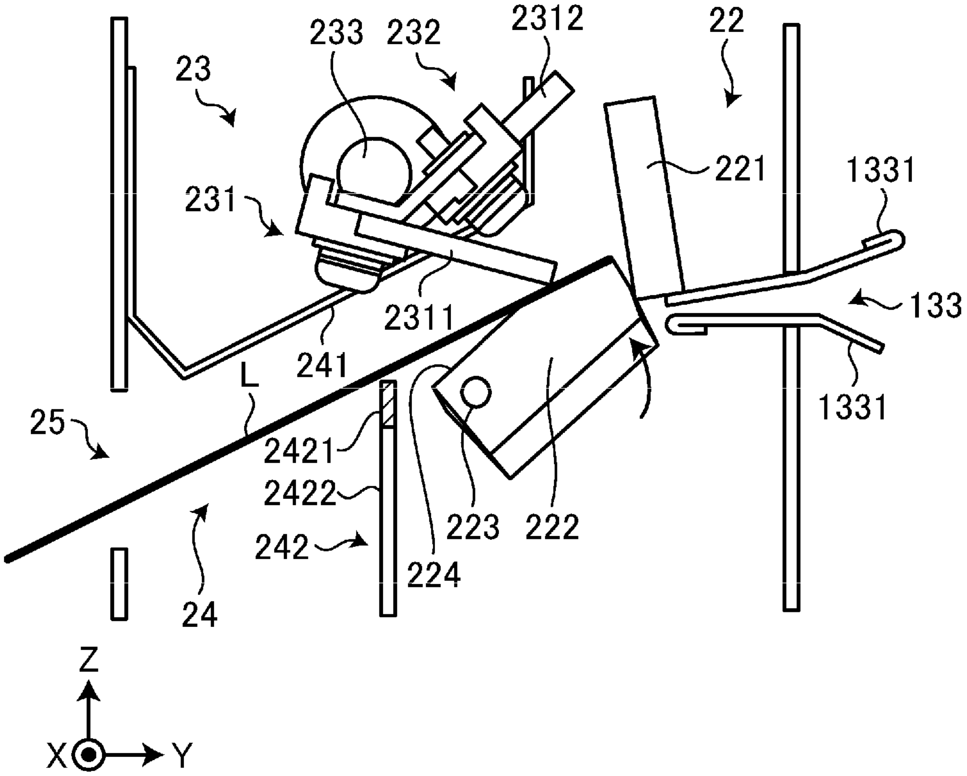
FIG. 11 is a diagram illustrating the operations of the cutting unit and the conveying unit of FIG. 10 according to another embodiment.

FIG. 11 illustrates a cut state immediately after the fabric label L is cut by the cutting unit 22. As illustrated in FIG. 11, a part of the cut fabric label L is placed on the upper surface 224 of the movable blade 222.

Here, since the fabric label L used in the present embodiment is formed of a material such as polyester, the fabric label L has a property of being weaker and easily charged as compared with a paper label formed of a paper medium. Therefore, when the fabric label L is handled, there is a possibility that the fabric label L is charged by the sliding (e.g., friction, etc.) during cutting or conveyance. Since the charged fabric label L is stuck to the surrounding members by a static force, the fabric label L cannot be normally discharged after being cut.

Therefore, in the printer 1 according to the present embodiment, efficient conveyance of the fabric label L is implemented by the paddle rotation of the conveying unit 23. Specifically, as illustrated in FIG. 11, the paddle rotation shaft 233 rotates clockwise in the drawing in conjunction with the cutting operation performed on the fabric label L by the movable blade 222, that is, the upward rotation of the movable blade 222. The first paddle blade 2311 of the first paddle portion 231 comes into contact with the upper surface 224 of the movable blade 222 in accordance with the rotation of the paddle rotation shaft 233, and moves in the conveyance direction while maintaining this contact state, thereby starting the scraping operation in the conveyance direction of the fabric label L present on the upper surface 224.

Accordingly, for example, even when the fabric label L is stuck to the upper surface 224 of the movable blade 222, the fabric label L can be conveyed (e.g., moved, etc.) toward the second discharge port 25 by the scraping operation of the first paddle portion 231.

As illustrated in FIG. 11, the height of the tip end of the lower guide unit 242 (e.g., the static removal brush 2421, etc.) is designed to be higher than the height of the upper surface 224 of the movable blade 222 on the lower guide unit 242 side, that is, the height on the downstream in the conveyance direction in the cut state. Accordingly, the fabric label L conveyed from the upper surface 224 of the movable blade 222 moves toward the second discharge port 25 while being in contact with the static removal brush 2421 of the lower guide unit 242. Accordingly, in the cutting device 2, since the charged fabric label L can be reliably subjected to the static removal, the fabric label L can be smoothly conveyed toward the second discharge port 25.

When the cutting of the fabric label L is finished, the movable blade 222 starts to rotate (e.g., move, etc.) downward (arrow direction in FIG. 12) to return to the standby position. On the other hand, the paddle rotation shaft 233 continues to rotate clockwise in the drawing. Therefore, the scraping operation in the conveyance direction is continued while the first paddle blade 2311 is in contact with the upper surface 224 of the movable blade 222.

Figure 12:
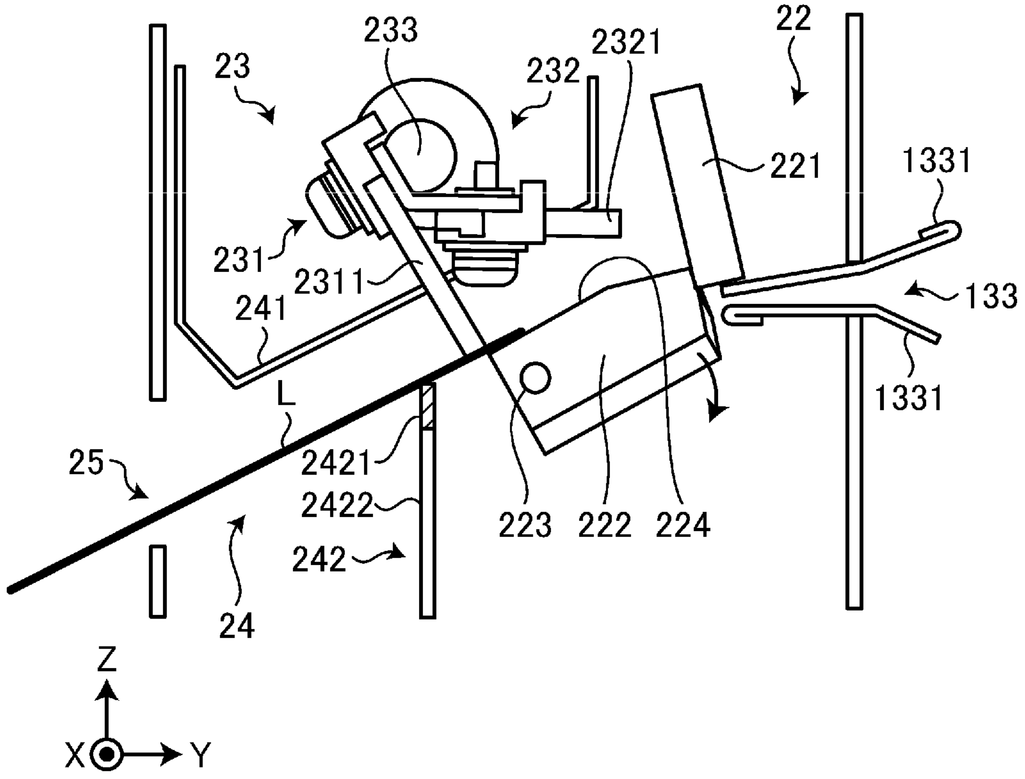
FIG. 12 is a diagram illustrating the operations of the cutting unit and the conveying unit of FIG. 10 according to another embodiment.

FIG. 12 illustrates a state immediately after the first paddle blade 2311 is separated from the upper surface 224 of the movable blade 222. Here, for example, there is a possibility that the rear end portion of the fabric label L is stuck to the upper surface 224 of the movable blade 222 due to the static force generated in the fabric label L, and therefore, the rear end portion may remain on the upper surface 224 even after the first paddle blade 2311 is separated. In the present embodiment, the rear end portion of the fabric label L remaining on the upper surface 224 is scraped by the second paddle portion 232 following the first paddle portion 231.

Figure 13:
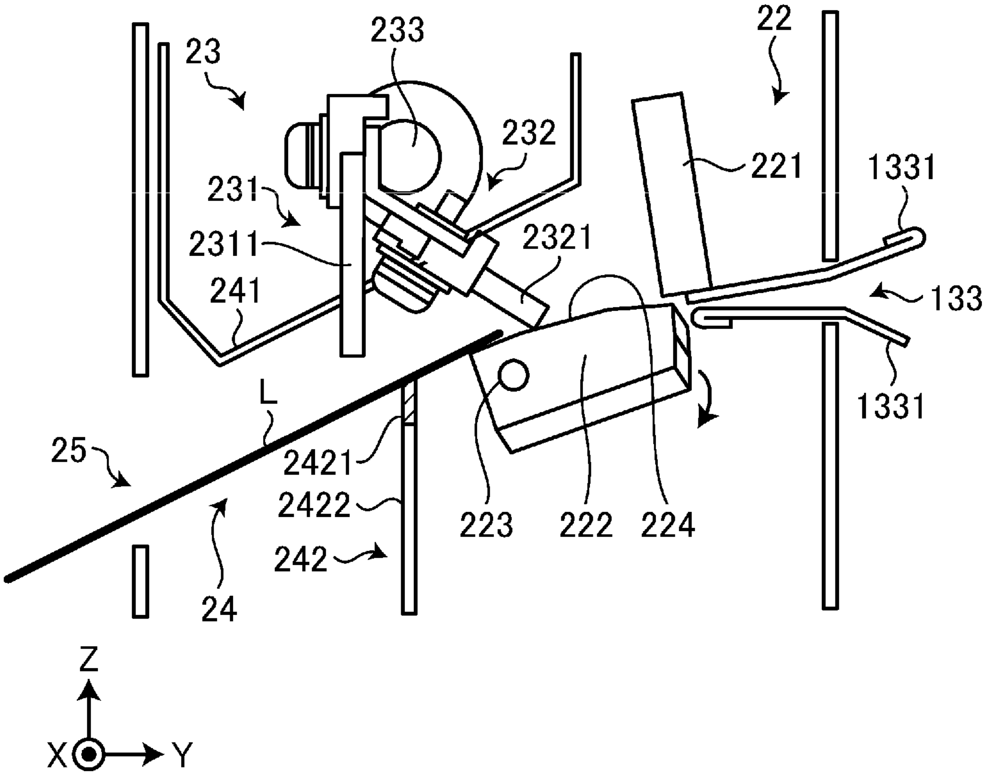
FIG. 13 is a diagram illustrating the operations of the cutting unit and the conveying unit of FIG. 10 according to another embodiment.

Specifically, as illustrated in FIG. 13, as the paddle rotation shaft 233 rotates clockwise, the second paddle blade 2321 of the second paddle portion 232 in contact with the upper surface 224 of the movable blade 222 moves in the conveyance direction along the upper surface 224. Accordingly, the second paddle portion 232 starts the scraping operation in the conveyance direction from the rear end of the fabric label L remaining on the upper surface 224 of the movable blade 222.

Figure 14:
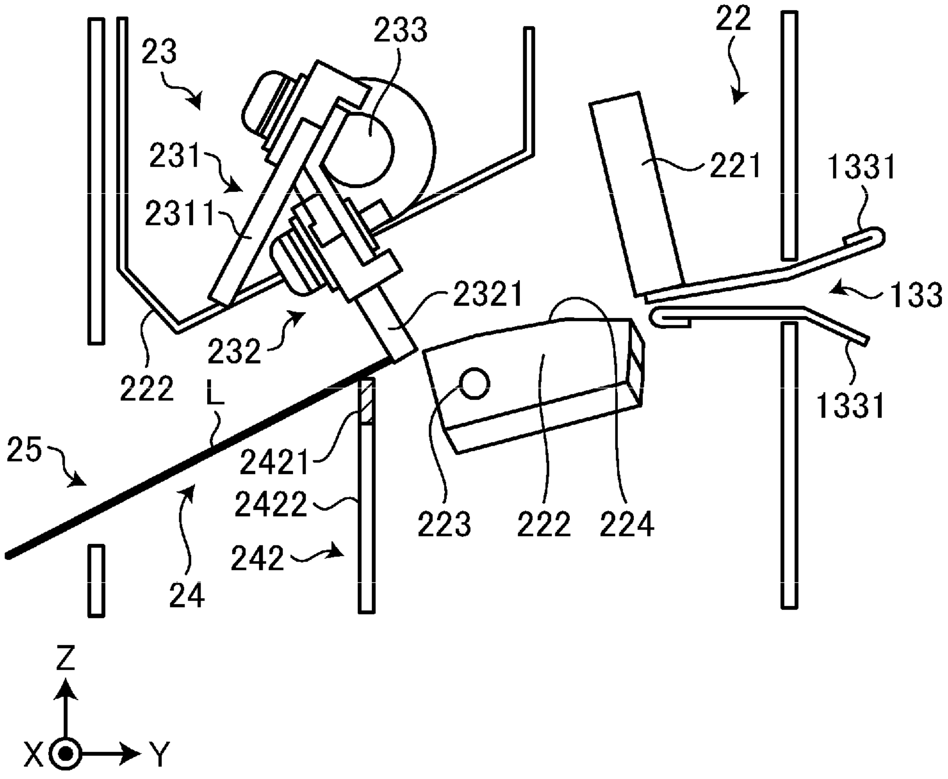
FIG. 14 is a diagram illustrating the operations of the cutting unit and the conveying unit of FIG. 10 according to another embodiment.

FIG. 14 illustrates a state immediately after the second paddle blade 2321 is separated from the upper surface 224 of the movable blade 222. As illustrated in FIG. 14, the second paddle blade 2321 pushes out the fabric label L from the rear end side of the fabric label L in the conveyance direction. Accordingly, in the conveying unit 23, even in a state in which the rear end side of the fabric label L remains on the upper surface 224 after the first paddle blade 2311 is separated, it is possible to more reliably convey the fabric label L in the conveyance direction.

As described above, the cutting device 2 according to the present embodiment includes: the cutting unit 22 provided on the conveyance path for conveying the fabric label L and configured to cut the fabric label L into a predetermined length; the upper surface 224 of the movable blade 222 forming a part of the conveyance path and allowing the fabric label L cut by the cutting unit 22 to be placed; the paddle rotation shaft 233 provided above the conveyance path and configured to rotate in the conveyance direction of the fabric label; the first paddle portion 231 and the second paddle portion 232 attached to the paddle rotation shaft 233 and configured to scrape the fabric label placed on the upper surface 224 in the conveyance direction by moving in the conveyance direction while being in contact with the upper surface 224 of the movable blade 222 in accordance with the rotation operation of the paddle rotation shaft 233; and the driving mechanism 3 configured to transmit the driving force to the cutting unit 22 and the paddle rotation shaft 233, and make the cutting operation of the cutting unit 22 and the rotation operation of the paddle rotation shaft 233 be in conjunction with each other.

Accordingly, in the cutting device 2, even in a state in which the cut fabric label L is charged, the cut fabric label L can be further biased in the conveyance direction by being subjected to the scraping operation by the first paddle portion 231 and the second paddle portion 232, and thus, the cut fabric label L can be efficiently conveyed (e.g., discharged, etc.). Further, in the cutting device 2, the cutting operation of the fabric label L and the scraping operation by the first paddle portion 231 and the second paddle portion 232 can be made be in conjunction with each other, and thus, a series of steps from cutting to discharge can be performed efficiently.

Further, the cutting device 2 can scrape the fabric label L placed on the upper surface 224 of the movable blade 222 in the conveyance direction using the first paddle portion 231 and the second paddle portion 232 attached at different angles.

Accordingly, in the cutting device 2, for example, even in a state in which the rear end portion of the fabric label L remains on the upper surface 224 of the movable blade 222 after scraping by the first paddle portion 231, the rear end portion of the fabric label L can be biased in the conveyance direction by being subjected to the scraping operation by the second paddle portion 232, and thus the cut fabric label L can be more reliably conveyed (discharged).

In addition, the cutting device 2 includes the static removal brush 2421 at a position where the fabric label L scraped from the upper surface 224 can come into contact with the static removal brush 2421 in the conveyance path downstream of the movable blade 222. Accordingly, in the cutting device 2, since the static electricity generated in the fabric label L can be removed, it is possible to prevent a situation such as sticking during conveyance, and it is possible to efficiently perform the conveyance (discharge) of the fabric label L.

The above-described embodiment can be appropriately modified and implemented by changing a part of the configuration or function of the printer 1 and the cutting device 2. Hereinafter, some modifications according to the above-described embodiment will be described as other embodiments. Hereinafter, points different from the above-described embodiment will be mainly described, and detailed description of points common to the already described contents will be omitted. In addition, modifications described below may be individually implemented or may be implemented in combination as appropriate.

First Modification

In the embodiment described above, for example, the movable blade 222 may be formed of a conductive member such as a metal, and the movable blade 222 may be connected to the housing 21 or the like by GND. Accordingly, since a potential difference due to the charging of the fabric label L can be prevented, the fabric label L can be conveyed more efficiently.

Second Modification

In the above-described embodiment, the configuration using the first paddle portion 231 and the second paddle portion 232 is described, but the exemplary embodiment is not limited thereto, and only the first paddle portion 231 (or the second paddle portion 232) may be used. For example, a single paddle portion may be used as long as the fabric label L can be conveyed only by the scraping operation by the single paddle portion according to the characteristics of the fabric label L to be used.

The number of paddle portions is not limited to two, and three or more paddle portions may be provided on the paddle rotation shaft 233 according to the characteristics of the fabric label L to be used. The attachment angles of the paddle portions to the paddle rotation shaft 233 are different from each other.

While embodiments have been described, the embodiments have been presented by way of example and are not intended to limit the scope of the disclosure. These novel embodiments and modifications can be implemented in various other forms, and various omissions, replacements, changes, and combinations can be made without departing from the gist of the disclosure. The embodiments and the modifications thereof are included in the scope and the gist of the disclosure, and are included in a scope of the disclosure disclosed in the claims and equivalents thereof.

What is claimed is:

1. A cutting device comprising:

a cutter positioned on a conveyance path for conveying a fabric medium, the cutter configured to cut the fabric medium into a predetermined length;

a placement surface defining a part of the conveyance path, the placement surface configured to receive the fabric medium cut by the cutter;

a rotation shaft positioned above the conveyance path and configured to rotate in a conveyance direction of the fabric medium;

a paddle portion attached to the rotation shaft and configured to scrape the fabric medium placed on the placement surface in the conveyance direction by moving in the conveyance direction while being in contact with the placement surface in accordance with a rotation operation of the rotation shaft; and a driver configured to transmit a driving force to the cutter and the rotation shaft, and such that a cutting operation of the cutter and the rotation operation of the rotation shaft are performed in conjunction with each other.

2. The device according to claim 1, wherein the driver transmits a driving force obtained from a driving source that is the driving source of the cutter and the rotation shaft.

3. The device according to claim 1, wherein a plurality of paddle portions are attached to the rotation shaft at different attachment angles.

4. The device according to claim 1, wherein
the cutter includes a fixed blade disposed above the conveyance path, and a movable blade disposed below the conveyance path, the movable blade defining the placement surface, and a blade surface, the blade surface provided on an end surface upstream in the conveyance direction.

5. The device according to claim 4, wherein the placement surface is an upper surface of the movable blade adjacent to the conveyance path.

6. The device of claim 4, wherein
the movable blade is configured to cut the fabric medium positioned between the movable blade and the fixed blade by rotating around a support shaft provided downstream in the conveyance direction and moving the blade surface in a vertical direction by the driving force transmitted from the driver.

7. The device according to claim 4, further comprising:
a static removal member provided downstream from the placement surface in the conveyance direction and below the conveyance path at a height at which the static removal member contacts the fabric medium scraped from the placement surface by the paddle portion, the static removal member is configured to remove static electricity from the fabric medium in contact.

8. The device according to claim 7, wherein
the height of the static removal member is lower than a height of the placement surface in a standby state before the movable blade moves upward, and is higher than a height of the placement surface in a cut state in which the movable blade cuts the fabric medium.

9. The device according to claim 7, wherein the static removal member is positioned to contact the paddle portion, and the height of the static removal member is based on a relationship with the placement surface.

10. The device according to claim 1, wherein the paddle portion is a first paddle portion, and the device further comprises:
a second paddle portion attached to the rotation shaft and configured to scrape the fabric medium placed on the placement surface after the first paddle portion in the conveyance direction by moving in the conveyance direction while being in contact with the placement surface in accordance with the rotation operation of the rotation shaft, wherein the second paddle portion comprises a different attachment angle than the first paddle portion with respect to the rotation shaft.

11. A printing device comprising:
a printer configured to print on a long fabric medium;
a cutter positioned along a conveyance path for conveying the printed fabric medium, the cutter configured to cut the fabric medium into a predetermined length;
a placement surface defining a part of the conveyance path, the placement surface configured to receive the fabric medium cut by the cutter;
a rotation shaft positioned above the conveyance path and configured to rotate in a conveyance direction of the fabric medium;
a paddle portion attached to the rotation shaft and configured to scrape the fabric medium placed on the placement surface in the conveyance direction by moving in the conveyance direction while being in contact with the placement surface in accordance with a rotation operation of the rotation shaft; and
a driver configured to transmit a driving force to the cutter and the rotation shaft, and such that a cutting operation of the cutter and the rotation operation of the rotation shaft are performed in conjunction with each other.

12. The printing device of claim 11, wherein the paddle portion is a first paddle portion attached to the rotation shaft at a first attachment angle.

13. The printing device of claim 12, further comprising a second paddle portion attached to the rotation shaft at a second attachment angle and configured to scrape the fabric medium placed on the placement surface in the conveyance direction by moving in the conveyance direction while being in contact with the placement surface in accordance with a rotation operation of the rotation shaft, wherein the second attachment angle is different from the first attachment angle.

14. The printing device of claim 11, wherein
the cutter includes a fixed blade disposed above the conveyance path, and a movable blade disposed below the conveyance path, the movable blade defining the placement surface, and a blade surface, the blade surface provided on an end surface upstream in the conveyance direction.

15. The printing device of claim 14, further comprises a housing, wherein the movable blade is coupled to the housing.

16. The printing device of claim 11, further comprising a plurality of paddle portions, and each of the plurality of paddle portions is attached to the rotation shaft at an attachment angle, wherein the attachment angle of each of the paddle portions are different.

17. A method comprising:
providing a fabric label to a printer, the printer configured to print information on the fabric label;
conveying the fabric label along a conveyance path to a cutter, the cutter comprising a fixed blade positioned above the conveyance path, and a movable blade positioned below the conveyance path, the movable blade defining a placement surface and a blade surface;
cutting the fabric label by rotating the movable blade from a first position to a second position by rotating the cutter about a shaft such that the blade surface of the movable blade contacts the fixed blade; and
scraping, by a first paddle portion, a first portion of the fabric label from the placement surface towards a discharge port.

18. The method of claim 17, further comprising:
brushing, by a static removal member, the fabric label scraped by the first paddle portion to remove a charge of the fabric label.

19. The method of claim 17, further comprising:
scraping, by a second paddle portion, a second portion of the fabric label from the placement surface toward the discharge port such that the fabric label is positioned downstream of the placement surface.

20. The method of claim 17, further comprising:
moving the cutter from the second position back to the first position; and
activating a standby state of the printer and the cutter.

* * * * *